United States Patent
Terui et al.

(10) Patent No.: US 8,930,372 B2
(45) Date of Patent: Jan. 6, 2015

(54) SEARCH ENGINE, SEARCH SYSTEM, SEARCH METHOD, AND SEARCH PROGRAM PRODUCT

(75) Inventors: Fumihiko Terui, Sagamihara (JP); Seiji Hamada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 12/371,736

(22) Filed: Feb. 16, 2009

(65) Prior Publication Data

US 2009/0216752 A1   Aug. 27, 2009

(30) Foreign Application Priority Data

Feb. 27, 2008 (JP) .................................. 2008-46582

(51) Int. Cl.
*G06F 17/30* (2006.01)
(52) U.S. Cl.
CPC .... *G06F 17/30616* (2013.01); *G06F 17/30634* (2013.01)
USPC ............ 707/741; 707/696; 707/711; 707/769
(58) Field of Classification Search
CPC ..................... G06F 17/30616; G06F 17/30634
USPC .................................. 707/696, 711, 741, 769
See application file for complete search history.

(56) References Cited

U.S. PATENT DOCUMENTS

| | | | |
|---|---|---|---|
| 5,706,365 A * | 1/1998 | Rangarajan et al. | 707/728 |
| 6,167,369 A | 12/2000 | Schulze | |
| 6,393,389 B1 * | 5/2002 | Chanod et al. | 704/7 |
| 6,493,721 B1 * | 12/2002 | Getchius et al. | 1/1 |
| 6,675,159 B1 * | 1/2004 | Lin et al. | 1/1 |
| 7,039,636 B2 * | 5/2006 | Tada et al. | 1/1 |
| 7,072,889 B2 * | 7/2006 | Ogawa | 707/742 |
| 2003/0154186 A1 * | 8/2003 | Goodwin et al. | 707/1 |
| 2003/0200211 A1 * | 10/2003 | Tada et al. | 707/5 |
| 2007/0214126 A1 * | 9/2007 | Kikinis | 707/3 |
| 2008/0005651 A1 * | 1/2008 | Grefenstette et al. | 715/500 |

FOREIGN PATENT DOCUMENTS

| | | | |
|---|---|---|---|
| JP | 9044522 | A | 2/1997 |
| JP | 9050442 | A | 2/1997 |
| JP | 2000231563 | A | 8/2000 |
| JP | 2001-034623 | | 2/2001 |
| JP | 2002269139 | A | 9/2002 |
| JP | 2003114906 | A | 4/2003 |
| JP | 2006-099427 | | 4/2006 |
| JP | 2006-106907 | | 4/2006 |
| JP | 2007286742 | A | 11/2007 |

* cited by examiner

*Primary Examiner* — Shew-Fen Lin
(74) *Attorney, Agent, or Firm* — Joe Polimeni; Edell, Shapiro & Finnan, LLC

(57) ABSTRACT

A search system can include a server, a token assignment unit for assigning types of tokens based on different kinds of character string analysis methods, an index generating unit for generating an index list that associates the tokens assigned with the token assignment unit, a type identification value for identifying a type of the character string analysis, and information, a search unit that receives a search word for referencing the information to combine types of search tokens generated from the search word to generate a single search command for parallel inquiry of the information to search for the information, and a search result generating unit for displaying information extracted in relation to the search word through parallel inquiry with the search unit and search tokens so as to identify the tokens.

19 Claims, 12 Drawing Sheets

FIG. 8

TEMP_TABLE 800

| INFORMATION_ID | SCORE_SUM |
|---|---|
| INF_1 | S(1) |
| INF_2 | S(2) |
| INF_3 | S(3) |
| ... | ... |

(a)

SORTING ⇑

RESULT_TABLE 810

| INFORMATION_ID | SCORE_SUM |
|---|---|
| INF_J | MAX |
| INF_L | SECOND_MAX |
| INF_P | THIRD_MAX |
| ... | ... |

(b)

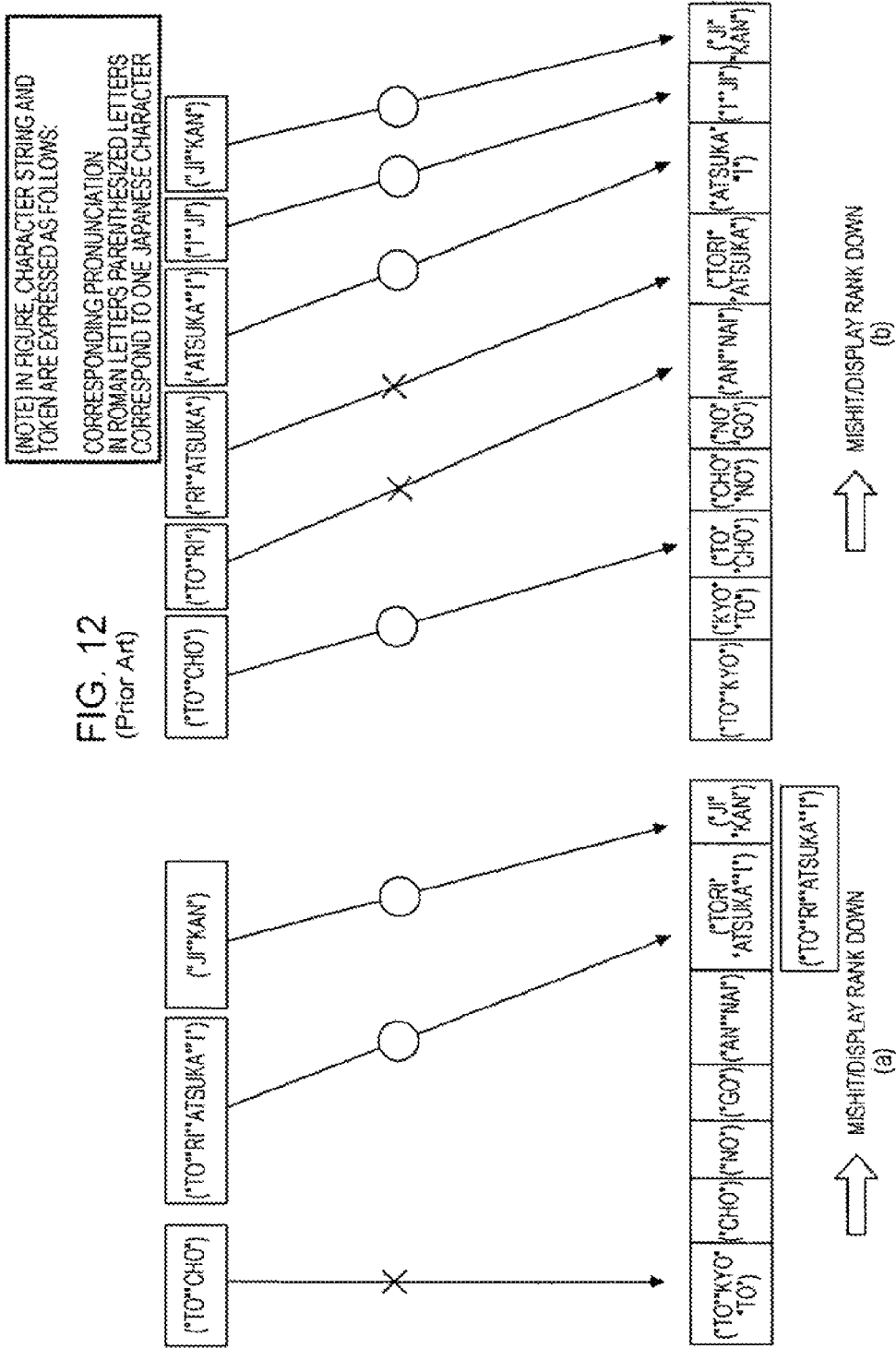

SEARCH ENGINE, SEARCH SYSTEM, SEARCH METHOD, AND SEARCH PROGRAM PRODUCT

CROSS-REFERENCE TO RELATED APPLICATIONS

This application claims the benefit of Japanese Patent Application No. 2008-46582 filed 27 Feb. 2008, entitled "SEARCH ENGINE, SEARCH SYSTEM, SEARCH METHOD, AND SEARCH PROGRAM PRODUCT", which is assigned to the assignee of the present application, and the teachings of which are hereby incorporated by reference in their entirety.

BACKGROUND

The present invention relates to an information search technique, and more specifically, it relates to a search technique that executes multiple character string analyses in parallel.

Along with recent developments in high-speed large-capacity communication infrastructures, such as those related to computers and the Internet, an enormous amount of information is generated and registered in an accessible form through a network. In response thereto, recently, there is an increasing demand for a search system that allows a user who accesses the information through the network and searches for target information to search for information including a document, an image, a music file, etc., as well as access the information.

In most of the search systems, target information is divided into unit segments (hereinafter referred to as "tokens") such as characters, words, and sentences and then indexed. Further, an input search word or search string is also divided into predetermined unit segments (hereinafter referred to as "search tokens") such as characters, words, or sentences. Whether to extract targeted information as a search result is determined based on whether tokens registered for the targeted information match with search tokens. At this time, it is necessary to generate tokens from a character string. Up to now, the token generating processing has been performed mainly using the following two methods.

A first one is a character string morphological analysis method. To describe how to generate tokens through morphological analysis, a character string is first segmented into unit words having a significant meaning, and the segmented words are registered as tokens. A second one is a so-called N-gram method. The N-gram method divides a character string by N characters in consideration of an overlap between N-character groups, and the N-character groups are registered as tokens.

According to the morphological analysis method, tokens are segmented or generated in units of words having a significant meaning by use of a dictionary. Therefore, the morphological analysis method enables high-quality search in consideration of the conjugation of each word with reference to a dictionary. On the other hand, the morphological analysis method is disadvantageous in that (i) any word not listed in a dictionary cannot be segmented, (ii) if erroneous word segmentation is carried out, even information including completely the same word as in a character string cannot be extracted as a search result, and (iii) maintenance of the dictionary is required.

In contrast, the N-gram method generates tokens by segmenting a character string in a mechanical manner. Therefore, the N-gram method can extract information including information including a completely matched character string as a search result. On the other hand, the N-gram method is disadvantageous in that (i) noise is easily generated if a character string partially matches a search token, for example, if a word ["to" "kyo" "to"] is determined to match with a search token ["kyo" "to"], and (ii) this method cannot cover synonymous variations of a word, such as the conjugation of a word registered as a token.

FIG. 12 (Prior Art) show processing of referencing search information based on conventional morphological analysis method and N-gram method. FIG. 12(a) shows referencing processing based on the morphological analysis method, and FIG. 12(b) shows referencing processing based on the N-gram method. It is assumed that a user operates a client computer to enter search words, ["to" "cho"] and ["to" "ri" "atsuka" "i" "ji" "kan"] to send a search request to a search engine through a network. The search engine includes, for example, a relational database, and inquires information managed with the relational database to search for the received search words using an SQL statement or the like.

It is assumed here that document data in the search-target information in this example includes metadata, a title, or headline information like ["to" "kyo" "to" "cho" "no" "go" "an" "nai" "tori" "atsuka" "i" "ji" "kan"]. The morphological analysis method segments a character string of the information into tokens using a dictionary, associates tokens different in notation such as synonymous words, conjugational words, or words having different declensional kana endings, with a corresponding token in the document data, and registers tokens inclusive of notational variations in an index list together with their positions or token numbers.

In the conventional example of FIG. 12(a), document data in the information is segmented into tokens of ["to" "kyo" "to"], ["cho"], ["no"], ["go"], ["an" "nai"], ["tori" "atsuka" "i"], and ["ji" "kan"]. As for the token "toriatsuka-i", a token ["to" "ri" "atsuka" "i"] that is different in declensional kana ending is indexed in association with the original token ["tori" "atsuka" "i"]. Under the above condition, if the referencing processing of FIG. 12(a) is performed, the search token ["to" "cho"] is not registered in the index list of the information, so the search engine indicates mishits. On the other hand, as for the search tokens ["to" "ri" "atsuka" "i"] and ["ji" "kan"], a corresponding token is registered in the index list, so the search engine indicates hit counts.

In the illustrated example of FIG. 12(a), if the search word ["to" "cho"] is not found, some patterns of search results are sent back depending on an implementation method of a search system; "mishit" is sent back as a search result, or a reliability (probability) is assigned, and a search result that ranks targeted information behind the other information is sent back.

On the other hand, in the illustrated example of FIG. 12(b), the referencing processing is performed based on the N-gram method. As for the search words ["to" "cho"] and ["to" "ri" "atsuka" "i" "ji" "kan"], tokens ["to" "cho"], ["atsuka" "i"], ["i" "ji"], and ["ji" "kan"] are hit. These tokens are indexed in relation to the information through the N-gram method. On the other hand, as for search tokens ["to" "ri"] and ["ri" "atsuka"] derived from the search words, any corresponding tokens are not indexed, so the search system sends back "mishit". In this case as well, some patterns of search results are sent back depending on an implementation method of a search system; "mishit" is sent back as the total search result, or a reliability (probability) is assigned, and a search result that ranks targeted information behind unintended information is sent back to the client computer.

This is mainly due to insufficient maintenance of the dictionary in FIG. 12(a) but in FIG. 12(b), is due to a problem of not considering conjugational or notational variations in the N-gram method.

A document search technique using the morphological analysis method and the N-gram method is disclosed in, for example, Japanese Unexamined Patent Application publication Nos. 2001-34623 (Patent Document 1), 2006-99427 (Patent Document 2), and 2006-106907 (Patent Document 3).

Patent Document 1 discloses an information search technique of segmenting a search-target text into unit words to generate word-information-added character string index including word information representing separation between words and having N characters to search for a search word through the word-information-added character string index based on one or both of character string search or word search. Further, another technique disclosed in Patent Document 1 is to record information about the boundary between morpheme words in association with information obtained through the N-gram method to thereby improve an accuracy of ranking. However, this technique cannot be directly applied to a search operation that reflects conjugational or notational variations that feature the morpheme in terms of using the word on the word boundary.

Further, Patent Document 2 discloses a full-text search technique including approximation degree determination means for determining the degree of approximation between hit counts upon primary search with an N-gram index and hit counts upon morpheme search with a morpheme index, and full-text search control means for controlling, if the approximation degree determination means determines the hit counts upon primary search with an N-gram index to approximate to the hit counts upon morpheme search with a morpheme index, first search means so as to skip secondary search with the N-gram index to use a result of the primary search or a result of the morpheme search as a search result.

Further, Patent Document 3 discloses a structured document management technique including index type determination means for determining an index type appropriate for each of a plurality of elements to be indexed in a structured document on an element basis, and index generating means for generating an index of the determined index type corresponding to the element and storing the index in index storage means.

In Patent Documents 1 to 3, one of the two methods, the morphological analysis method and the N-gram method is chosen to search for the information indexed in different manners using different character string analysis methods. Further, the indexes generated using different character string analysis methods are independently searched for, and search results are combined so that the final result includes a result of the morphological analysis and a result of the N-gram method.

However, in order to combine the results, it is necessary to perform complicated search processing as well as prepare both of a search engine for the morphological analysis method and a search engine for the N-gram method. This processing costs high. Further, also if a search result of the morpheme analysis/morphological analysis method and a search result of the N-gram method are generated and combined, each result involves advantages and disadvantages of each character string analysis method. Therefore, even if search operations are simply performed independently and search results are combined, in the conventional examples of FIG. 12, for example, the search result reflects problems of each method, so satisfactory accuracy and search cannot be realized. Here, "search quality" means such a quality that omission is minimized, noise can be removed enough, and a search result highly faithful to a search word (string) input by a user can be obtained.

Further, in the case of independently performing the search processing based on the two methods, two types of search engines should be prepared, as many search operations as the number of character string analysis methods should be performed, search results still involve advantages and disadvantages inherent in the individual character string analysis methods, and a search quality cannot be improved only by simply combining search results. From the viewpoint of the above drawbacks, such search processing is not preferable in terms of human/hardware resources, and quality and cost.

BRIEF SUMMARY

As described above, in the conventional techniques, a document that ranks high only on account of matching with an input search word (string) is not always an intended one, and effective search is not performed. Further, as for the morphological analysis method, in the case of processing a language involving notational variations, a lot of time and effort should be expended for maintenance of a dictionary to handle variations such as the conjugation of a word, declensional kana ending, humble expressions, or respectful expressions, and in addition, the problems inherent in the morphological analysis methods sill remain to be solved.

On the other hand, in the case of processing a language the expression of which is not separated with blank characters or separators such as a space placed between words, and describes "machidashiwa, nihonnotokyotoniarimasu", for example, in a continuous sequence of nonwhitespace characters, for example, using words having a specific meaning, such as "tokyoto" ["to" "kyo" "to"], "nihon" ["ni" "hon"], and "machidashi" ["machi" "da" "shi"], characters are expressed in 2 bytes each, and each character has a brief or incomplete meaning. The N-gram method is supposedly effective for such languages, and if the N-gram method is effectively used, the omission could be minimized. However, the N-gram method judges hit or mishit based on whether a character string is matched regardless of its meaning as compared with the morphological analysis method. Thus, problems inherent in the N-gram method still remain to be solved, such as a problem of increasing noise or a problem of not covering expressional variations.

The present invention has been accomplished in view of the problems of the related art. Accordingly, an embodiment of the present invention can provide a search engine, a search system, a search method, and a search program product, which can give a search result highly faithful to a search word (string) input by a user.

In another embodiment, the present invention can provide a search engine, a search system, a search method, and a search program product, which can improve an accuracy of search for a character string including multibyte characters, in a language the expression of which is not separated with separators such as a space placed between words, and which expresses a significant meaning in a continuous sequence of characters, for example, Japanese, Chinese, Korean, or Arabic, and can give a search result with high fidelity.

In still another embodiment, the present invention can provide a search engine, a search system, a search method, and a search program product, which can display a search result with advantages of both of a morphological analysis method and an N-gram method being maintained and disadvantages thereof being mutually reduced, and facilitate discrimination of a search result.

According to an embodiment of the present invention, search tokens derived from a search word (string) for searching targeted information, which is input by a user, through a morphological analysis method and an N-gram method, are linked in parallel for parallel inquiry. The targeted information is searched based on the parallel inquiry. Document data in the information is indexed using tokens generated with the morphological analysis method and the N-gram method. As for a search operation based on the parallel inquiry, the parallel inquiry involves search tokens generated with different character string analysis methods based on the same search word. Thus, if any type of search token matches with a token of the document data, a result of searching for the search word is judged "hit". In the context of an embodiment of the present invention, the parallel inquiry refers to referencing processing for linking a search command in the form of SQL statement etc. to search tokens generated from the same search word with different character string analysis methods, consolidating hit information into a set of inquiries, and sending back the sum of hit information for each search token.

If the search word includes plural search strings, parallel inquiry is executed on the basis of search word, and a set of inquiries is generated so as to list all sets of inquiries. The inquiry sets for each parallel inquiry corresponding to a search word or search string, are ranked by summing up scores assigned to each search token to thereby select information as a search result in descending order of the total scores.

The thus-assigned scores reflect the degree to which the targeted information includes tokens generated with the morphological analysis method and the N-gram method. As a result, a search result of an embodiment of the present invention is more faithful to a character string in targeted information or a search word (string) in a text portion. Regarding a drawback of the morphological analysis method, that is, a problem that some tokens cannot be hit due to insufficient maintenance of a dictionary, the drawback can be canceled with an advantage of the N-gram method. Further, a drawback of the N-gram method, that is, a problem of not covering expressional variations, the drawback can be canceled with an advantage of the morphological analysis method.

According to an embodiment of the present invention, calculation of scores for information is executed to assign high score to information having tokens extracted with the N-gram method and the morphological analysis method, which match with a search token. As a result, fidelity to a search word (string) of document data in information is further improved with either the morphological analysis method or the N-gram method.

Moreover, according to an embodiment of the present invention, a summary of information in a search result is generated, a position of a search token is determined by applying a result of segmenting information into N-gram tokens, to the summary, and a search word is highlighted using a word generated through morphological analysis. Tokens generated with the N-gram method are used for determining an exact position in a text portion of the information and mapping a morphological analysis result to the position in the text portion determined with the N-gram tokens to thereby determine an exact position thereof. In addition, a level of correspondence between token strings obtained with the N-gram method and the morphological analysis method can be also highlighted in association therewith.

Processing subsequent to segmentation into tokens in an embodiment of the present invention is not influenced by language. Hence, embodiments of the present invention are applicable to not only languages expressed in so-called multi-byte characters, such as Japanese, Chinese, Korean, Arabic, Hindi, and Hebrew, but also languages expressed in single-type characters with separators, such as a space between words, such as English, German, French, Italian, and Spanish.

BRIEF DESCRIPTION OF THE SEVERAL VIEWS OF THE DRAWINGS

FIG. 8 is shows processing of generating a result set displayed for a client based on an intermediate result set generated through processing of FIGS. 6 and 7.

FIG. 12 (Prior Art) shows conventional referencing processing for search information based on a morphological analysis method and an N-gram method.

DETAILED DESCRIPTION

Figure 1:
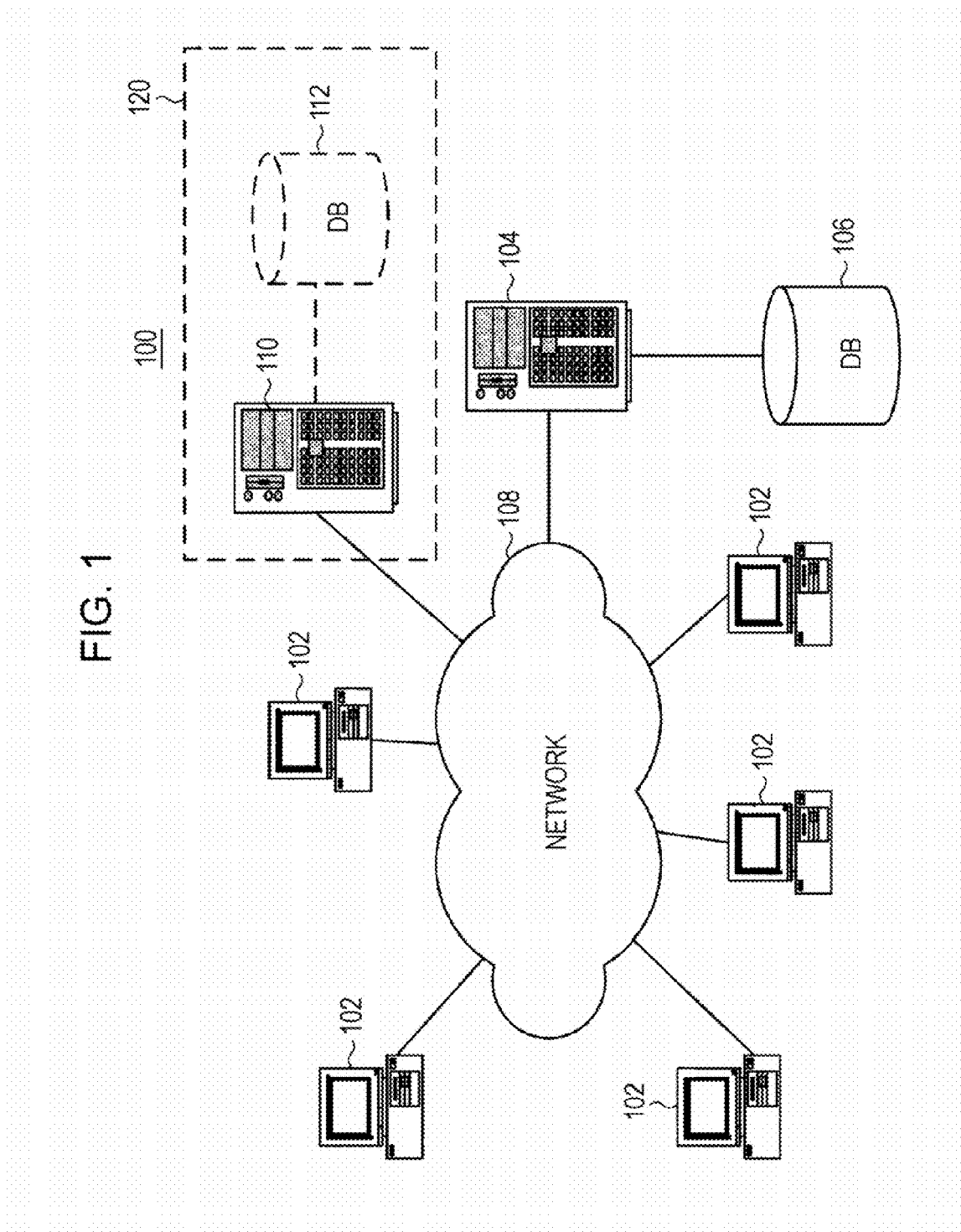
FIG. 1 is a functional block diagram of a search system according to an embodiment of the present invention.

The present invention will be further illustrated with embodiments below. However, the present invention is not limited to the following embodiments. FIG. 1 shows an example of a search system 100 according to an embodiment of the present invention. The search system 100 includes a set of client computers (hereinafter referred to as "clients") 102, and a server computer (hereinafter referred to as "server") 104 that receives a search request from the clients 102 and sends back a search result to the clients 102.

The clients 102 and the server 104 are mutually connected through a network 108. Further, dispersive computing environment such as RMI (remote method invocation), RP (remote procedure call), EJB (enterprise Java® beans), CORBA (common object broker architecture) may be set between the clients 102 and the server 104 through the network 108 based on a transaction protocol, such as a TCP/IP. Alternatively, CGI (common gateway interface), Servlet, a database application, and other such server programs may be installed into the client 102 side based on an HTTP protocol.

The clients 102 may include one or more single-core processor or multi-core processor and other hardware/firmware/software typical of a computing device. Each client 102 can be implemented as, for example, a personal computer or a work station. Further, the clients 102 may execute any operating system, such as WINDOWS®, UNIX®, LINUX®, and MAC OS.

The server 104 can be implemented as a dispersive computing proxy server or a web server as long as the server is controlled by an operating system, such as WINDOWS® 200X, UNIX®, and LINUX®, and can handle a search request from the clients 102 and send back a search result to the clients 102.

Further, in order to remotely access a database 106 to obtain a search result, the clients 102 can be equipped with JDBC (Java® database component) and the other component class to access databases such as MySQL, DB2, ORACLE®, PostageSQL, SQLserver, and ACCESS. In addition, needless to say, a server program can be generated using a language of a web browser, CGI, JAVA®, PERL, or RUBY without using any special business database and imparted with similar functions.

The server 104 of FIG. 1 manages the database (DB) 106 that functions as database means set on a storage device such as hard disk and realized by opening a database application such as a RAM. The database 106 stores information in a computer-accessible format. Conceivable examples of the information include document data, image data, and multimedia data. The information includes character strings of, for example, a data main portion, metadata, a title, and a headline. In the following description, character strings to be searched are inquired as document data. In the case of registering information in the database 106, the server 104 applies a morphological analysis method or an N-gram method to the document data in the information to generate tokens with each method, followed by data mining by use of an index list together with a posting list of positional information of tokens. Then, the tokens are registered in the database 106 in association with the information.

The database means may not be executed by the above special database application but may have any configuration insofar as the database can register data in plural items for special information in association with each other. Further, the database means may be configured as OODB (object oriented database) as well as a relational database.

FIG. 1 shows another example of the search system. In the other example, the server 104 is imparted with functions of search engine means that are mainly realized by cooperative operations of hardware and software. As indicated by a broken-line box 120, a database server 110 provided as a proxy server manages a database 112 to perform retrieval of information, data mining, and storage of information. In the other example of FIG. 1, the database server 110 receives a search request from the server 104, inquires the database 112, and sends back the inquiry result to the server 104 to thereby offer a search result to the clients 102.

In the other example of FIG. 1, the server 104 does not need to have the database 106 and needs only to handle a search request from the client 102, so search processing or processing for displaying a search result can be performed at high speeds. This example is one contemplated way to implement the server 104 as a web server.

In the case of implementing the database server 110, the hardware resources of the server 104 may be partially assigned to the database server instead of configuring the server as a remote proxy. Alternatively, the database server 110 and the server 104 may be provided into a single rack using an appliance server or a thin server.

Further, in the other example of the present invention, the search system 100 may be implemented as a stand-alone personal computer that incorporates a large-capacity hard disk device, a server, a main frame, or other such information search modules.

Figure 2:
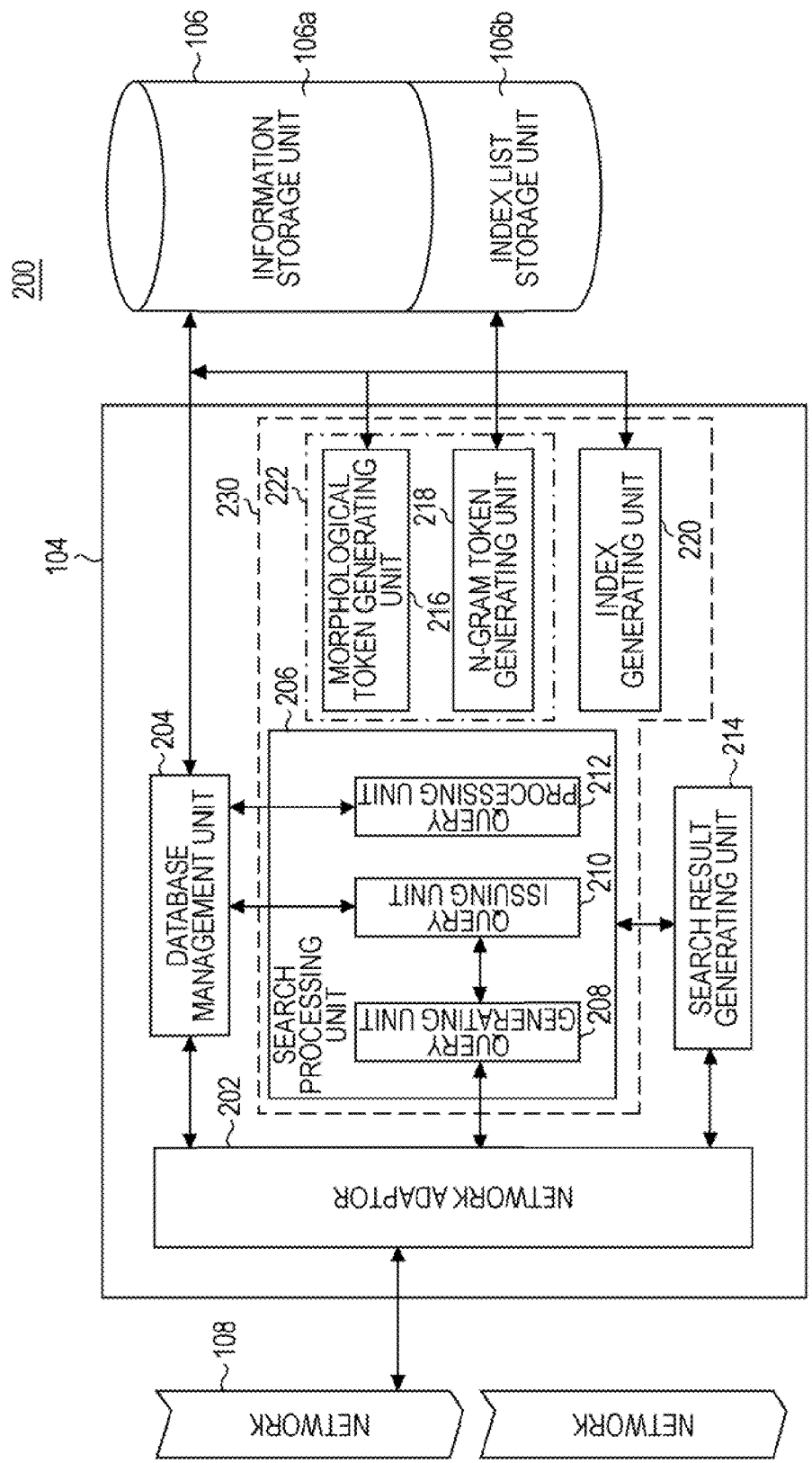
FIG. 2 is a functional block diagram of a search system 100 implemented on a server 104 according to an embodiment of the present invention.

FIG. 2 shows a functional block 200 of the search system 100 implemented on the server 104 of this embodiment. Each functional unit of FIG. 2 is executable on the server 104 by opening a problem on a memory of the server 104 and executing the program to control hardware resources.

To describe the functions of the server 104 in more detail, the server 104 includes a network adaptor 202. The network adaptor 202 is a communication processing unit including a network interface card (NIC) etc. The network adaptor 202 receive a search request sent from the clients 102 through a network 208 such as the Internet, LAN, or WAN, and sends the received search request to each functional means. Further, the network adaptor 202 receives information to be stored in the database 106 and executes data mining for the information to register the information in the database 106. The processing of the server 104 will be described stepwise (i.e., (A) Information Storage of Server; (B) Token Generation; (C) Generation of Index List; (D) Assignment of Scores; (E) Search Processing; and, (F) Search Result Generating Processing).

(A) Information Storage of Server

When receiving information to be stored, the server 104 notifies a database management unit 204 of the information to perform registration of the received information in the database or data mining to generate an index list. The database management unit 204 is implemented on the server 104 as database management means by opening a problem on a RAM that provides a work area of the processor. If receiving information, the database management unit 204 stores information in an information storage unit 106a of the database 106. Then, the database management unit 204 calls a morphological token generating unit 216 and an N-gram token generating unit 218 to apply morphological analysis or N-gram method to the received information to generate a morphological token and an N-gram token. The term "morphological token" refers to a token generated from document data through morphological analysis. The term "N-gram token" refers to a token generated from document data with the N-gram method.

The morphological token generating unit 216 and the N-gram token generating unit 218 are implemented on the server 104 as morphological token generating means and N-gram token generating means by opening programs or the like on a RAM that provides a work area of the processor. In this embodiment, the morphological token generating unit 216 and the N-gram token generating unit 218 are collectively referred to as a token assignment unit 222 functioning as token assignment means through cooperative operations of hardware and software. The token assignment unit 222 may be equipped with a character string analysis token generating unit using another character string analysis method if needed. During processing for generating tokens with each analysis method, a serial number (TOK_ID) and character range in document data (POS_ID), and positional information (Posting list) of the tokens in document data in the information are obtained.

After that, the database management unit 204 registers the generated morphological tokens and N-gram tokens, serial numbers of the tokens, and an absolute positional range in the document data are registered in association with INF_ID as an information identification value of the information including the document data to generate an index list. Further, at this time, the database management unit 204 registers scores assigned to the morphological tokens and N-gram tokens in the index list so as to rank each search word (string). The generated index list is stored in an appropriate storage area in the database 106, more specifically, an index list storage unit 106*b* in the example of FIG. 2.

(B) Token Generation

Schematic token generating operations of the morphological token generating unit 216 and the N-gram token generating unit 218 are as follows. That is, the morphological token generating unit 216 and the N-gram token generating unit 218 segment a character string in one document data into predetermined tokens in different manners. For example, considering the information including document data that has a text form "machidashiwatokyotoniarimasu" ["machi" "da" "shi" "wa" "to" "kyo" "to" "ni" "a" "ri" "ma" "su"], in the case of applying morphological analysis to the text, the morphological token generating unit 216 references a dictionary to segment the text like {["machi" "da"], ["shi"], ["wa"], ["to" "kyo" "to"], ["ni"], ["a" "ri"] (["a" "ru"]), ["ma" "su"]}. The parenthesized term is the conjugation of a word. Such expressional variations are listed in the dictionary. On the other hand, in the case of applying the N-gram (N=2) method thereto, a given number of characters are duplicated and the text is segmented like {["machi" "da"], ["da" "shi"], ["shi" "wa"], ["wa" "to"], ["to" "kyo" "to"], ["kyo" "to"], ["to" "ni"], ["ni" "a"], ["a" "ri"], ["ri" "ma"], ["ma" "su"]}. The N-gram method does not need a dictionary, and tokens are generated in accordance with the arrangement sequence of character strings. Further, as for the N-gram method, if N=2, only one character is used twice to generate N-gram tokens. In the other example, N may be any other positive integer, and the number of duplicate characters may be set to other positive integer.

(C) Generation of Index List

An index list is generated in such a format as indexes the generated morphological tokens and N-gram tokens to information including document data, with an index generating unit 220, and stored in the index list storage unit 106*b* of the database 106. The index generating unit 220 is implemented on the server 104 as index generating means by opening a program on the RAM that provides a work area of the processor. In the exemplary embodiment, the index list defines mtext for registering morphological tokens and ntext for registering N-gram tokens in its fields, and stores the tokens in the respective fields in association with each other to register the original information in an indexable manner.

If areas for storing the respective tokens cannot be separated definitely in the index list, for example, the tokens may be given a pattern or a character string itself of each token may be processed to discriminate between the tokens and register the tokens. Further, the field of mtext or ntext or a field name, or a pattern or character is used as a type identification value for identifying a type of character string analysis executed for generating a token.

Further, registered in the index list are an information identification value, a serial number of each token generated from document data, a positional range of each token in the original document data, and stores assigned to each token and given to each character string analysis method.

(D) Assignment of Scores

In general, the number of N-gram tokens generated with the N-gram method is larger than that of morphological tokens generated with the morphological analysis method. As for the above text "machidashiwatokyotoniarimasu" ["machi" "da" "shi" "wa" "to" "kyo" "to" "ni" "a" "ri" "ma" "su"], the number of morphological tokens including expressional variations is 8, and the number of N-gram tokens is 11. In consideration of the condition, scores assigned to the morphological tokens and scores assigned to the N-gram tokens can be weighted. For example if the N-gram token scores 1, a score of 11/8 may be assigned to the morphological token.

The above weights may be set as appropriate in accordance with ranking of search operations. For example, the same scores can be assigned to the morphological token and the N-gram token. Alternatively, after counting the number of morphological tokens and the number of N-gram tokens, if the morphological tokens and the N-gram tokens are completely matched, the same scores in total may be assigned. In another example, in consideration of significance of the meaning or expression of each token, the sum of completely matched morphological tokens may be set s times larger than the sum of completely matched N-gram tokens (s is an arbitrary real number of 1 or more) in order to impart significance to the correspondence of the morphological tokens.

In still another example, a score of the morphological tokens and a score of N-gram tokens may be set to 10 and 1, respectively. The index list including the above data is generated with the index generating unit 220 and then registered in the index list storage unit 106*b* secured in an appropriate area of the database 106 such that document data in the information can be inquired.

(E) Search Processing

The search processing is carried out with a search processing unit 206. The search processing unit 206, an query generating unit 208, an query issuing unit 210, and an query processing unit 212 are implemented on the server 104 as search means, inquiry generating means, inquiry issuing means, and inquiry processing means by opening programs on the RAM that provides a work area of the processor. Further, in the example where the database 106 is managed with a database server, the search processing unit 206 of FIG. 2 functions as search means for requesting the database to search for targeted information. The inquiry letter generating unit 208 analyzes a search request received from the clients 102 to extract a search word (string) from a search work (string) and sets the word as an argument to an inquiry such as SQL (structured query language) to generate an inquiry. The inquiry generated with the inquiry letter generating unit 208 is sent to the inquiry letter issuing unit 210 and then passed from the inquiry letter issuing unit 210 to the database management unit 204 as a search command.

If receiving the inquiry, the database management unit 204 inquires the database 106 to obtain a set of inquiries corresponding to the inquiry. The obtained inquiry set is sent to the query processing unit 212. The query processing unit 212 can select 1000 results from among the maximum number of results as a search result using each scored information. Hence, the query processing unit 212 can sort the total scores. After that, the query processing unit 212 sends data for generating a result set as a search result to the search result generating unit 214.

(F) Search Result Generating Processing

The search result generating unit 214 is implemented on the server 104 as search result generating means by opening a program on the RAM that provides a work area of the processor. The search result generating unit 214 receives the data for generating the result set and then references the index list to obtain a posing list to generate a summary from document data in the information to additionally highlight target data using the tokens and the posting list. The search result generating unit 214 specifies an URI of the original information or a path name to link the summary, for example, and generates the summary in a format of structured document such as HTML or XML or in a format of the other applications. The generated search result is sent to the clients 102 through the network adaptor 202 to allow the clients 102 to reference the search result.

In another example, as indicated by the broken line of FIG. 2, a search engine 230 can be configured as the server 104. In this example, the search engine 230 functions as search means in a web server, for example, and can include the search processing unit 206, the database management unit 204, the morphological token generating unit 216, the N-gram token generating unit 218, and the index generating unit 220. The search engine 230 may be configured independently of a database server managed with the database 106. If the database server is configured as another proxy server, the database server may include the database management unit 204, the morphological token generating unit 216, the N-gram token generating unit 218, and the index generating unit 220 of the server 104.

In this example, the search processing unit 206 of the server 104 implements a component class such as JDBC and sends the obtained search word and search tokens to the database server to obtain a search result and send back the result to the clients 102. In the other example, the query processing unit 212 can add a set of data about positional information used as the posting list to data obtained as a set of inquiries in order to omit inquiries to the database server 110 configured as a remote proxy. In this embodiment, for ease of explanation, the server 104 also manages the database 106.

Figure 3:
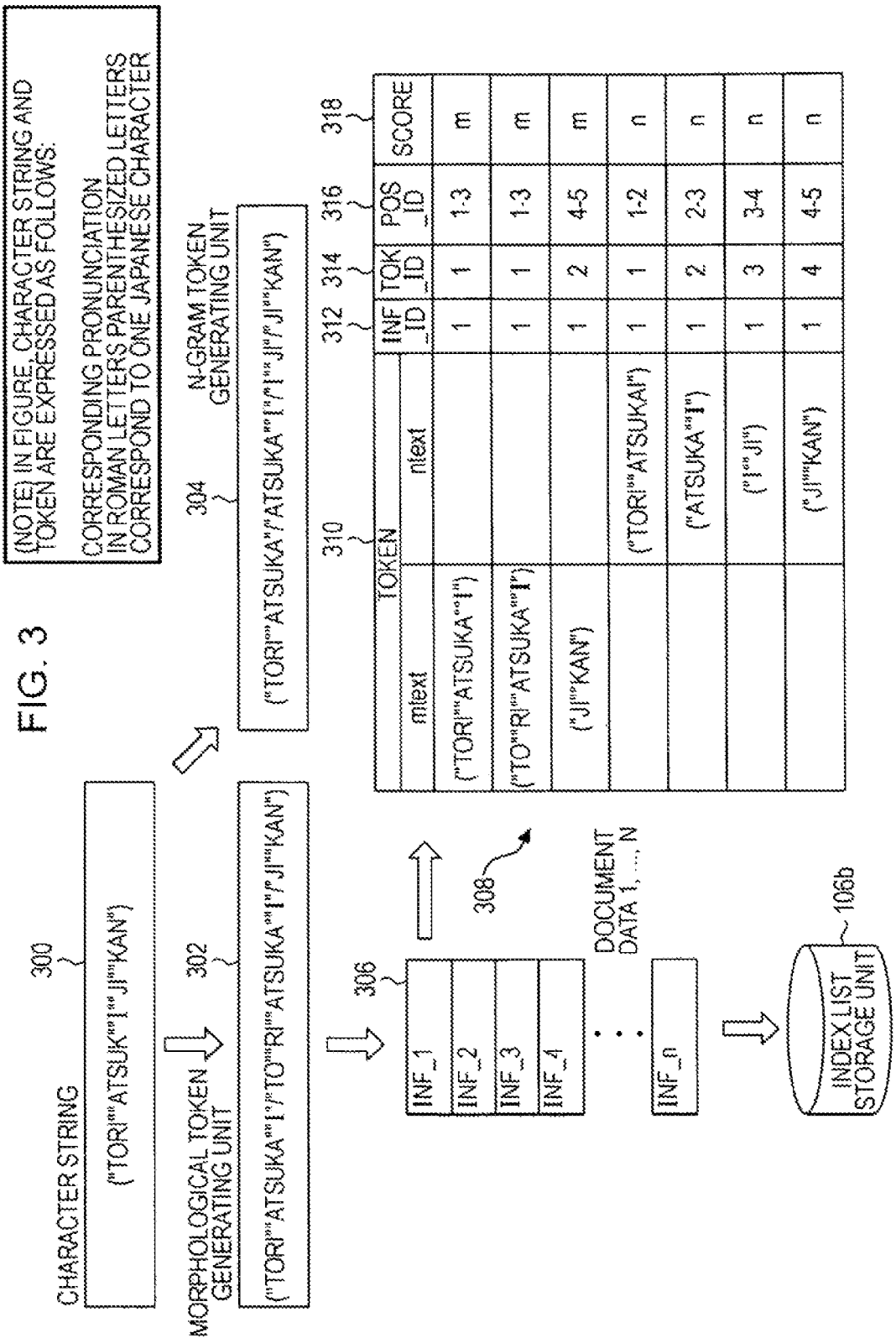
FIG. 3 is a schematic diagram showing processing of a database management unit 204, a morphological token generating unit 216, an N-gram token generating unit 218, and an index generating unit 220 together with data structures generated through each processing.

FIG. 3 is a schematic diagram showing processing of the database management unit 204, the morphological token generating unit 216, the N-gram token generating unit 218, and the index generating unit 220 of this embodiment together with data structures generated for each processing. If receiving new information, the database management unit 204 registers the information in the database 106 with an information identification value. In the example of FIG. 3, information is document data ["tori" "atsuka" "i" "ji" "kan"] 300. The following description is given on the assumption that information identification value (INF_ID)=1. The document data ["tori" "atsuka" "i" "ji" "kan"] 300 is sent to the morphological token generating unit 216 and the N-gram token generating unit 218, and tokens are generated based on each segmentation method.

The morphological token generating unit 216 segments the document data ["tori" "atsuka" "i" "ji" "kan"] 300 into token strings 302 of ["tori" "atsuka" "i"], ["to" "ri" "atsuka" "i"], and ["ji" "kan"] with reference to a dictionary. Further, the morphological token generating unit 216 generates the posting list for ["tori" "atsuka" "i"] with TOK_ID=1 and position in document data POS_ID=1-3. Likewise, the posting list is generated for ["to" "ri" "atsuka" "i"] with TOK_ID=1 and POS_ID=1-3, and for ["ji" "kan"] with TOK_ID=2 and POS_ID=4-5. These tokens are generated based on morphological analysis, so the index generating unit 220 registers the tokens in association with SCORE=m. In the illustrated example, the data are registered in an mtext field of a token field 310, an INF_ID field 312, a TOK_ID field 314, a POS_ID field 316, and a SCORE field 318 in ascending order of TOK_ID.

On the other hand, the N-gram token generating unit 218 segments the character string ["tori" "atsuka" "i" "ji" "kan"] 300 into token strings 304 of ["tori" "atsuka"], ["atsuka" "i"], ["i" "ji"], and ["ji" "kan"]. After that, the N-gram token generating unit 218 generates the posting list with the TOK_ID and the POS_ID. The index generating unit 220 obtains the above values. As for SCORE, the tokens are generated through N-gram token analysis and thus, SCORE=n is obtained. The data are registered in an ntext field of the token field 310, the INF_ID field 312, the TOK_ID field 314, the POS_ID field 316, and the SCORE field 318 in ascending order of TOK_ID to generate index data 308 for information inquired with INF_1.

After the completion of referencing the data INF_1, the next information INF_2, INF_3, INF_4, . . . , INF_n are obtained to generate corresponding index data for targeted document data in each information. In the example of FIG. 3, in an index list 306, index data corresponding to INF_ID as an information identification value are registered in descending order and registered in the index list storage unit 106b of the database 106. The index list storage unit 106b may be a storage area separate from the information storage unit 106a. For example, a field different from that of the information storage unit 106a may be assigned thereto.

In one embodiment, the morphological tokens and the N-gram tokens are both registered in the index list to be inquired. However, an index list including morphological tokens and an index list including N-gram tokens may be separately generated if a consumption amount of hardware resources and processing efficiency are competitive to those of the embodiment, in any special application. Then, identification values of the index list to be referenced may be changed for parallel inquiry, and the inquiry results may be summed.

Figure 4:
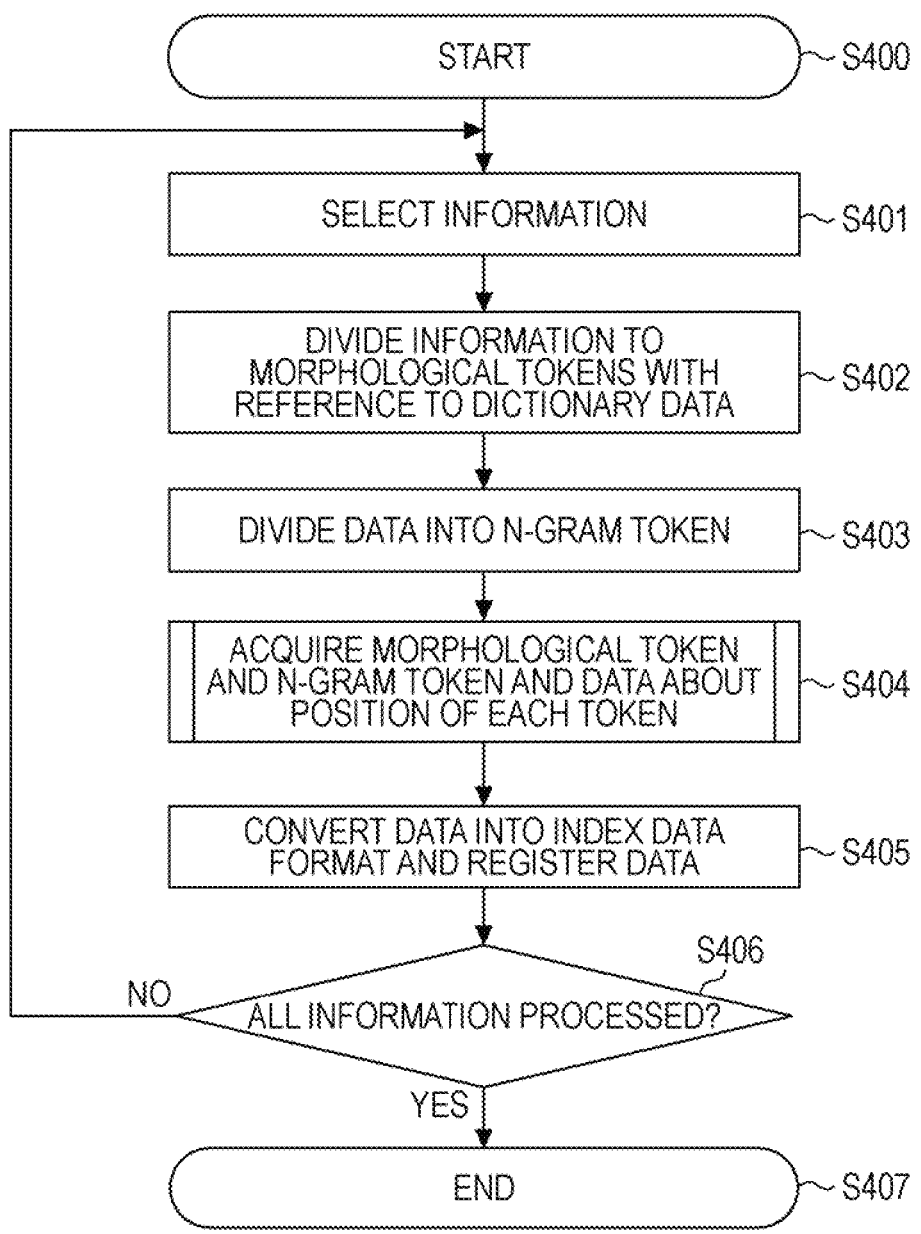
FIG. 4 is a flowchart of an example of processing for generating an index list 306.

FIG. 4 is a flowchart of processing for generating the index list 306 according to this embodiment. The processing starts with step S400, and in step S401, the first information is selected. In step S402, the morphological token generating unit 216 is called to segment information into morphological tokens with reference to dictionary data. In step S403, the N-gram token generating unit 218 is called to segment information into N-gram tokens. The processes in steps S402 and S403 may be carried out in parallel, not in order, as shown in FIG. 4.

In step S404, morphological tokens, N-gram tokens, and positional data TOK_ID and POS_ID of each token are obtained as the posting list. In step S405, the data is converted into a format of index data and registered in the index list 306 in association with INF_1. In step S406, it is determined whether all information has been indexed. In step S406, if the determination result shows that processing of the document is all completed (YES), the processing is terminated in step S407. In step S406, if the determination result shows that processing of the document is not completed (NO), the processing flow is branched to step S401 to repeat the processing until all document is indexed.

Figure 5:
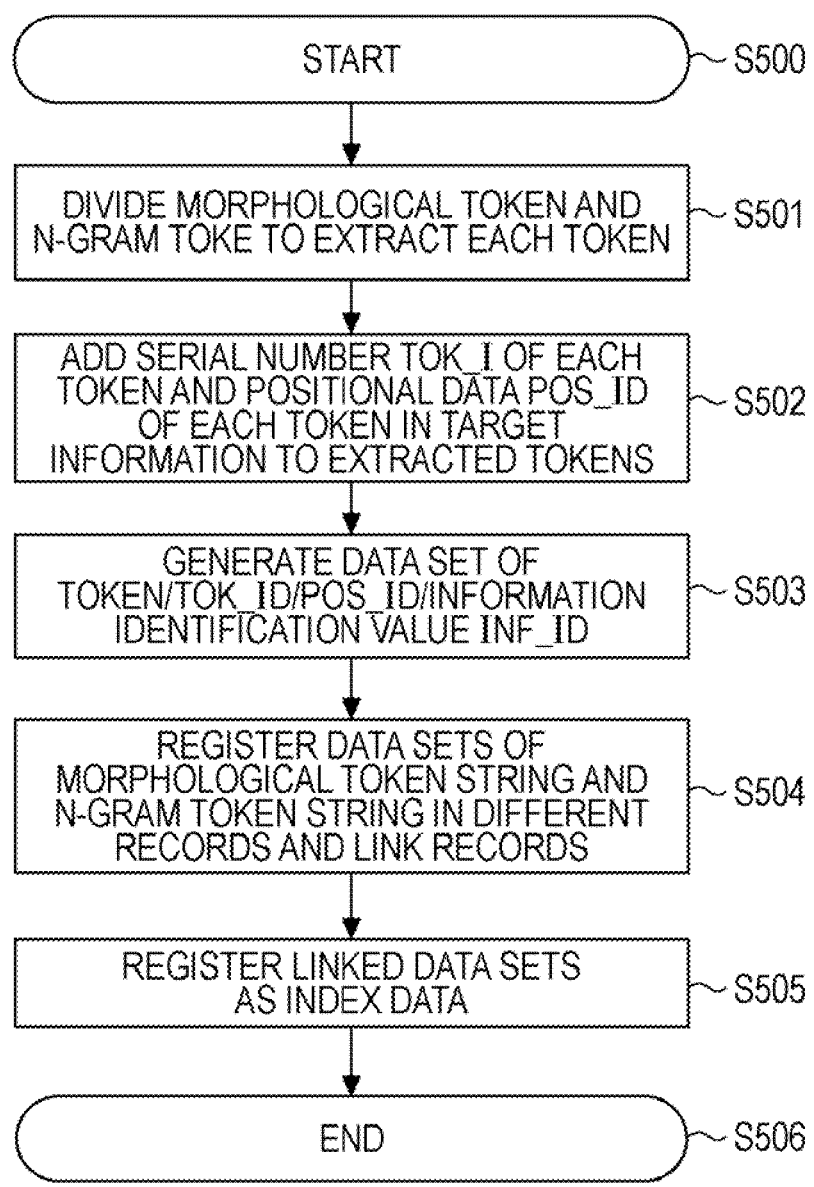
FIG. 5 is a detailed flowchart of processing in step S404 of FIG. 4.

FIG. 5 is a detailed flowchart showing the processing in step S404. The processing starts with step S500. In step S501, tokens are extracted using the morphological token generating unit 216 and the N-gram token generating unit 218. In step S502, a serial number TOK_ID of each token and positional data POS_ID of each token in targeted information are added to the extracted tokens. In step S503, a data set of token/TOK_ID/POS_ID/information identification value INF_ID is generated and registered in a corresponding record. In step S504, data sets of a morphological token string and an N-gram token string are registered in different records with an item in the fields of mtext and ntext and linked in the look-up table.

In step S505, at the stage of generation of each token string for specific information, tokens are registered as look-up data for the specific information identification value, and the processing is terminated in step S506.

Figure 6:
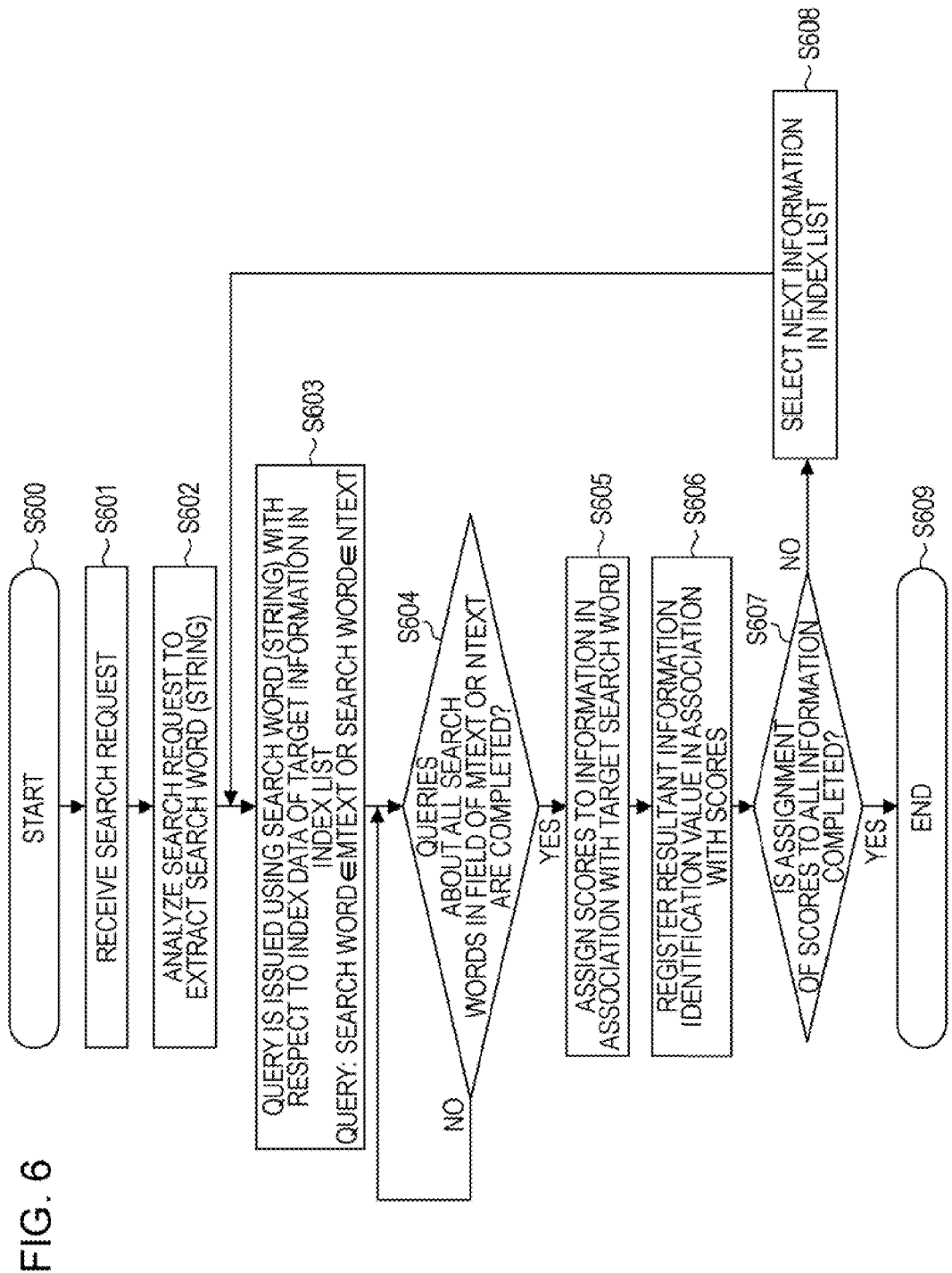
FIG. 6 is a flowchart of a search method executed with a search system.

FIG. 6 is a flowchart of a search method executed with the search system. The processing of FIG. 6 is carried out as a service of the server 104 and Daemon process. During the operation of the server 104, a search result corresponding to a search request is preferably sent back, after which the processing starts with step S600 to wait for a search request. The search method of FIG. 6 is started with step S600, and in step S601, a search request is received. The search request is sent based on an HTTP protocol is the server 104 is implemented as a web server or sent as a packet based on a transaction protocol such as TCP/IP if the server 104 is implemented on the other dispersive computing board.

In step S602, the server 104 analyzes a search request to obtain a search word (string). The search word means a character string input by a user with the clients 102. The search string means a search word string including nonwhitespace characters separated with separators (for example, space). In step S603, an inquiry is issued using a search word (string) with respect to index data of the information in the index list. The inquiry is made by searching for a target search word in the field of mtext or ntext.

In step S604, it is determined whether inquiries about all search words in the field of mtext or ntext are completed. In step S604, if inquiries about all search words in the field of mtext or ntext are completed (YES), in step S605, scores are assigned to the information in relation to the search word. Further, if inquiries about all search words in the field of mtext or ntext are not completed, the processing is repeated until inquiries about all search words in the field of mtext or ntext are completed. The assignment of scores may be performed by collectively summing up the scores of mtext and scores of ntext for the same information, not separately. As the expression for calculating the total sum (SUM), various expressions are conceivable but the total sum can be simply performed based on Expression (1) below.

$$SUM = \sum_{hit\_mtext} m + \sum_{hit\_ntext} n \quad (1)$$

In Expression (1) above, m represents scores assigned to a morphological token, n represents scores assigned to an N-gram token, hit_mtext represents the number of hit morphological tokens corresponding to a search word, and hit_mtext represents the number of hit N-gram tokens corresponding to a search word. The score m and score n may be separately given appropriate weights $w_m$ and $w_n$ in consideration of hit counts of morphological tokens rather than that of N-gram tokens as described above. The weight $w_m$ is a weight of the morphological token, and $w_n$ is a weight of the N-gram token. If the morphological token and the N-gram token are both hit, the weights may be assigned by weighting hit counts of morphological tokens under the condition of $w_m=w_{mn}$ ($w_{mn}>w_m$).

After that, in step S606, the information identification value INF_ID and scores are registered in association with each other as a result so as to reference the information. In step S607, it is determined whether scores are assigned to all information. In step S607, if scores are not yet assigned to all information (NO), in step S608, the next information is selected and the processing flow is branched to step S603 and the processing is repeated. In step S607, if scores are assigned to all information (YES), the processing is terminated in step S609. A set of inquiries can be defined in a temporary table (global variable) as RAW_TABLE, for example. The RAW_TABLE can be used for subsequent generation of search results.

Figure 7:
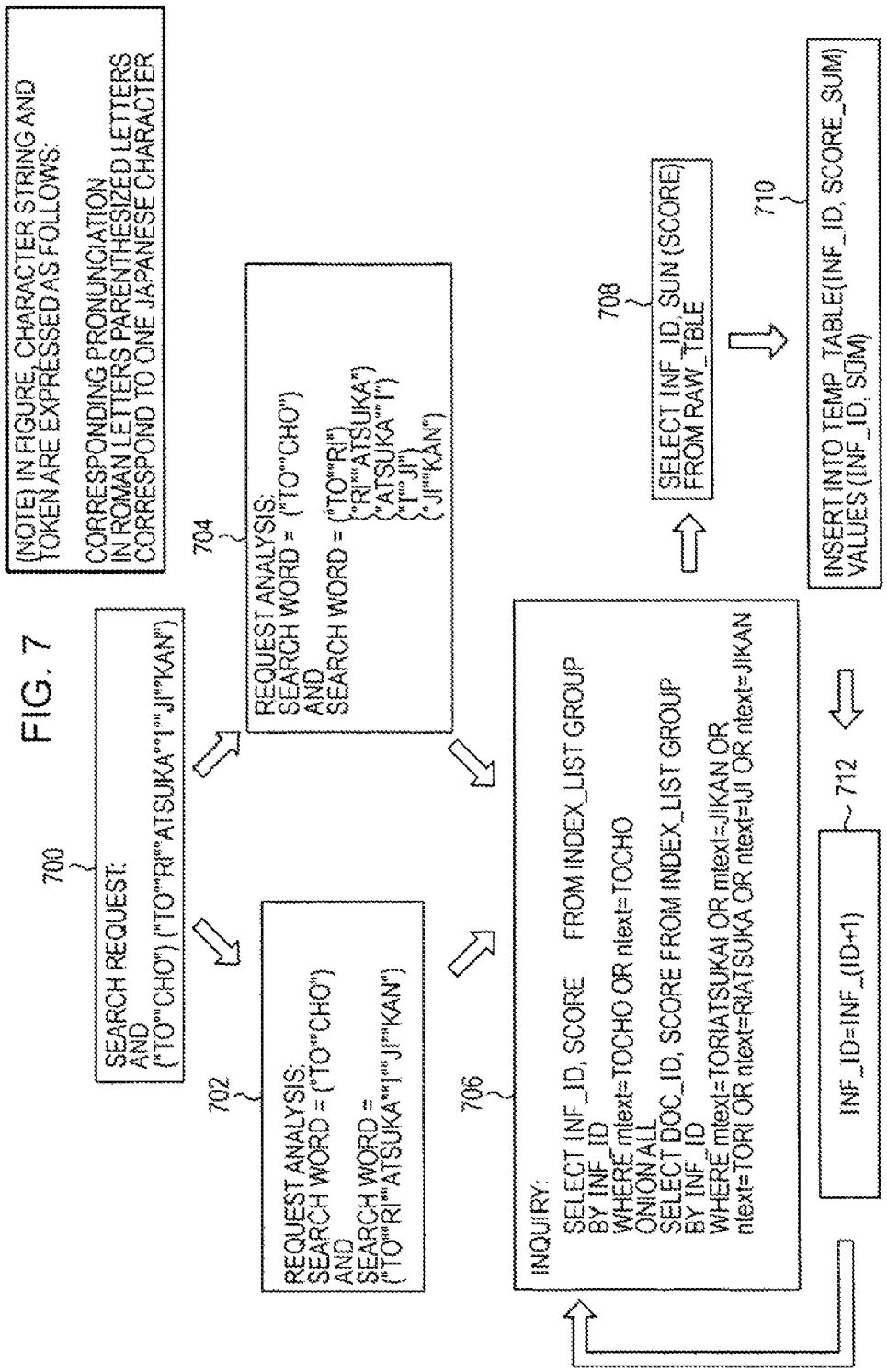
FIG. 7 shows an example where processing of FIG. 6 is executed using a database application with SQL statement.

FIG. 7 shows a specific example of the processing of FIG. 6, in which a database application such as DB2 (registered trademark of International business machines corporation) is used to implement the processing using the SQL statement. The server 104 receives a search request 700. The search request is sent as a search string where 2 search words ["to" "cho"] and ["to" "ri" "atsuka" "i" "ji" "kan"] are linked with AND. The inquiry letter generating unit 208 of the server 104 calls the morphological token generating unit 216 and references a dictionary to analyze the request through search request analysis 702. Search tokens are extracted from the search word based on morphological analysis as ["to" "cho"], ["to" "ri" "atsuka" "i"] and ["ji" "kan"]. The search word is set in a value of the SQL statement of an inquiry 706.

Likewise, the inquiry letter generating unit 208 calls the N-gram token generating unit 218 to segment the search word into search tokens ["to" "cho"], ["to" "ri"], ["ri" "atsuka"], ["atsuka" "i"] ["i" "ji"], and ["ji" "kan"] through the search request analysis 702, and the search word is set in a value of the SQL statement of an inquiry 706. The inquiry letter issuing unit 210 issues an inquiry to the database management unit 204 to execute inquiry.

Here, as for a relationship between search words, in the specific example of FIG. 7, sets of inquiries for ["to" "cho"] and ["to" "ri" "atsuka" "i" "ji" "kan"] are combined through UNION ALL based on a type of the search word in the search request. Further, an inquiry about ["to" "cho"] is a single query letter where the morphological token and the N-gram token are linked with OR as follows: WHERE mtext=tocho OR ntext=tocho. An inquiry about ["to" "ri" "atsuka" "i" "ji" "kan"] is a single SQL statement where all types of tokens derived from ["to" "ri" "atsuka" "i" "ji" "kan"] are linked with OR in WHERE, and sets of inquiries are linked with each other with an overlap.

If many search strings are set, search word tokens are generated on the basis of search word, and an inquiry condition is set to {WHERE morphological token OR N-gram token} to generate an inquiry to execute an inquiry and generate sets of inquiries. The inquiry sets for each search word are combined through UNION ALL in the example of SQL statement to produce a new set. Hence, an inquiry set can be obtained and scores can be assigned considering both of morphological tokens and N-gram tokens in the information at the stage of search processing.

The inquiry set is generated with the database management unit 204 in the form of view, for example, new table with a name of RAW_TABLE. After that, the database management unit 204 extracts the total sum of INF_IDs and SCOREs from RAW_TABLE that lists the result set using the inquiry 708. Then, TEMP_TABLE is generated as a temporary table (global) to generate files of INF_ID and SCORE_SUM in TEMP_TABLE using the inquiry 710 to register values of INF_ID and SUM in each field. After that, the block 712 sets a value of INF_ID for designating information to be inquired to a value designating the next information, and sends the inquiry 706 about the next information.

The search processing is terminated when the above referencing processing is executed on all information. At this time, generated in TEMP_TABLE is an intermediate result set where INF_ID of information associated with a search word (string) and the total sum of morpheme scores and N-gram scores of each search word (string) are registered. The above referencing processing can be executed by a server using an appropriate component class such as JDBC as a macro object by use of an appropriate programming language such as JAVA®, PERL, and RUBY. Further, instead of using any special database application, the processing can be implemented using a server program such as a web browser, JAVA® SCRIPT, CGI, and JAVA®. An appropriate implementation mode can be selected depending on the condition of a database application (database application is structured or licensed).

In this embodiment, if the database server for managing the database 106 is used as a proxy server, the following data structure can be obtained; data of the posting list such as TOK_ID o POS_ID associated with the morphological tokens and N-gram tokens is set in RAW_TABLE to describe detailed data in entry files of TEMP_TABLE OR RESULT_TABLE. In this example, it is unnecessary for the server 104 to reference the index list to be managed with a remote proxy each time through the network 108, and a search result can be displayed with higher processing efficiency.

In another example thereof, instead of combining results through UNION ALL as in the inquiry 706, if an amount of information registered in the database 106 is small, sequential search processing may be performed such that RAW_TABLE is generated through parallel inquiry, and parallel inquiry is performed on RAW_TABLE using another search token as hardware resources permit, to thereby generate an inquiry set.

FIG. 8 shows processing for generating a result set for displaying data for the clients 102 based on the intermediate result generated in accordance with the processing of FIGS. 6 and 7. An intermediate result set 800 includes a field 802 for registering an information identification value for designating information and a field 804 for generating the total scores associated with a search word (string) of information specified with the information identification value, which are generated as TEMP_TABLE. The information identification value and the total scores of the information are registered as a record in the files 802 and 804.

In the case of displaying a search result for the clients 102, the intermediate result set 800 is sorted based on the total scores to generate a result set 810, and search results are displayed for the clients 102 in the order of entry of the result sets 810. This processing is carried out with the query processing unit 212. In the case of processing the result in the form of result set 810, the query processing unit 212 sends the result set 810 in a table form to the search result generating unit 214. In another example thereof, the query processing unit 212 can send record data in the format of CSV, comma-delimited file, and space-delimited file to the search result generating unit 214.

In either example, the search result generating unit 214 obtains URI, URL, or path name of stored information using received data. Then, the search result generating unit 214 references the document data in the information and generates a search result in a format of separately indicating a reference result of the information and the summary. Moreover, the search result generating unit 214 highlights a search word with respect to the summary and generates a search result in such a format as can display the data for the clients 102.

Figure 9:
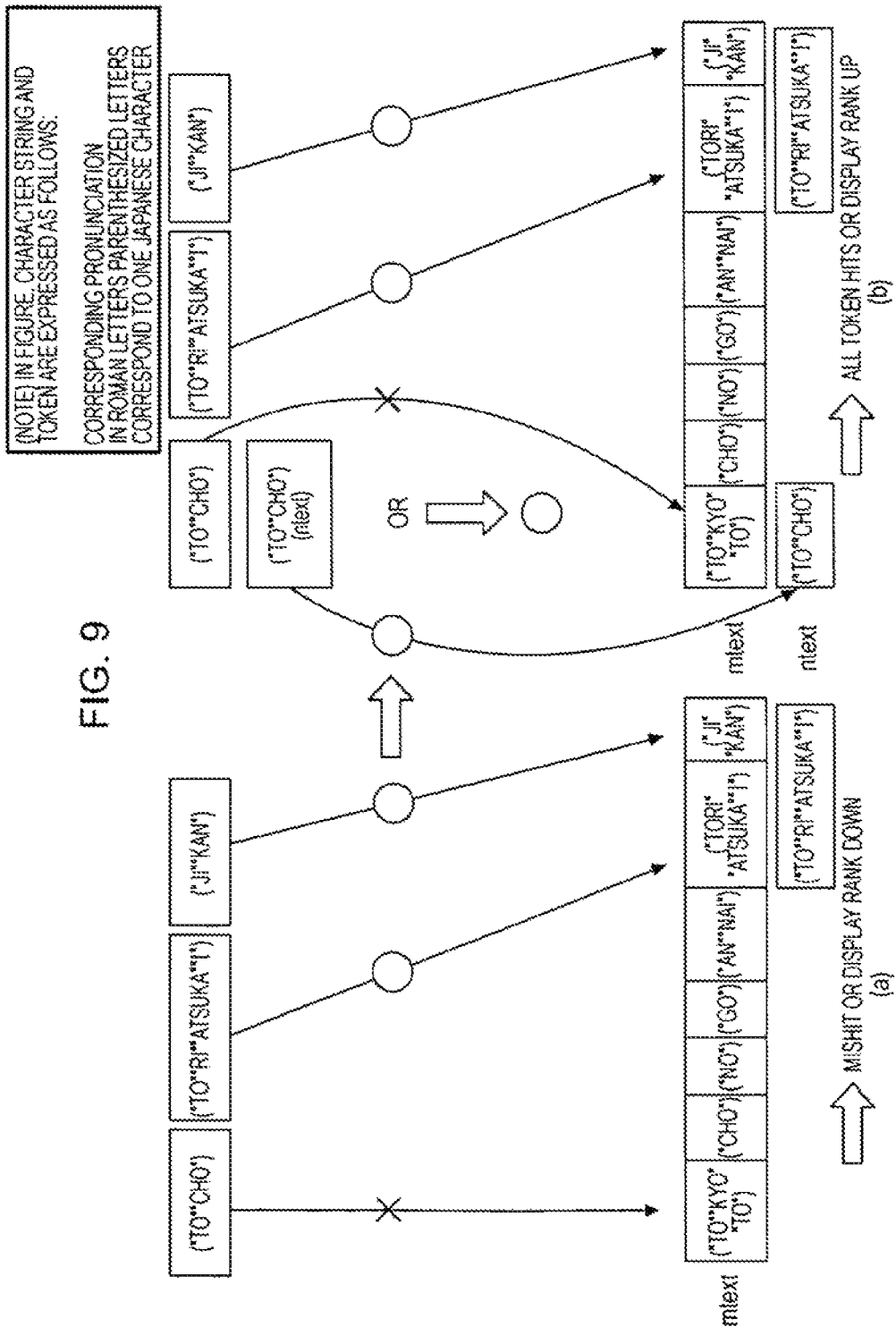
FIG. 9 shows a result of comparing the degree of increase in hit rate upon token parallel search processing of the search system of the present invention with that of a conventional one.

FIG. 9 show a result of comparing the degree of increase in hit rate based on token parallel search processing executed with the search system of this embodiment and that executed with the conventional one. FIG. 9(*a*) shows a comparison result in the case of separately searching for the morphological tokens and N-gram tokens as in a Federation type or N-gram based word boundary type. FIG. 9(*b*) shows an example of processing for collectively searching for the morphological tokens and the N-gram tokens according to this embodiment.

As shown in FIG. 9(*a*), in a comparative example, if the morphological tokens do not include a search word ["to" "cho"], a search result for the search word token is "mishit", and the information is omitted from the search result or ranks low because of mishit. On the other hand, in this embodiment, the search processing is carried out using both search word tokens generated with the morphological analysis method and the N-gram method. In the embodiment of FIG. 9(*b*), the search word token ["to" "cho"] generated with the morphological analysis method and the search word token ["to" "cho"] generated with the N-gram method are used in parallel for searching for the information. The information is indexed with the morphological tokens and the N-gram tokens. Further, the search processing is executed by linking search tokens generated with the morphological analysis method and the N-gram method with OR. As a result, all search tokens are hit, with the result that a hit rate or its rank can be increased compared with the case of searching for the morphological tokens and N-gram tokens independently of each other.

In the embodiment of FIG. 9, the search word tokens ["to" "ri" "atsuka" "i"] and ["ji" "kan"] are indexed with the morphological tokens. However, there is a possibility of mishitting the search word depending on a maintenance cycle of a dictionary or novelty of a word, and omitting the information from the search result. In this case as well, the search system of this embodiment can perform high-accuracy search by effectively utilizing both of features of the morphological analysis and the N-gram method based on the information registered in the server 104 at this point independently of the maintenance cycle of a dictionary or novelty of a word.

Further, in this embodiment, an amount of data in the index list can be reduced without using the index list indexed with the morphological tokens and N-gram tokens, and target information can be highlighted.

Figure 10:
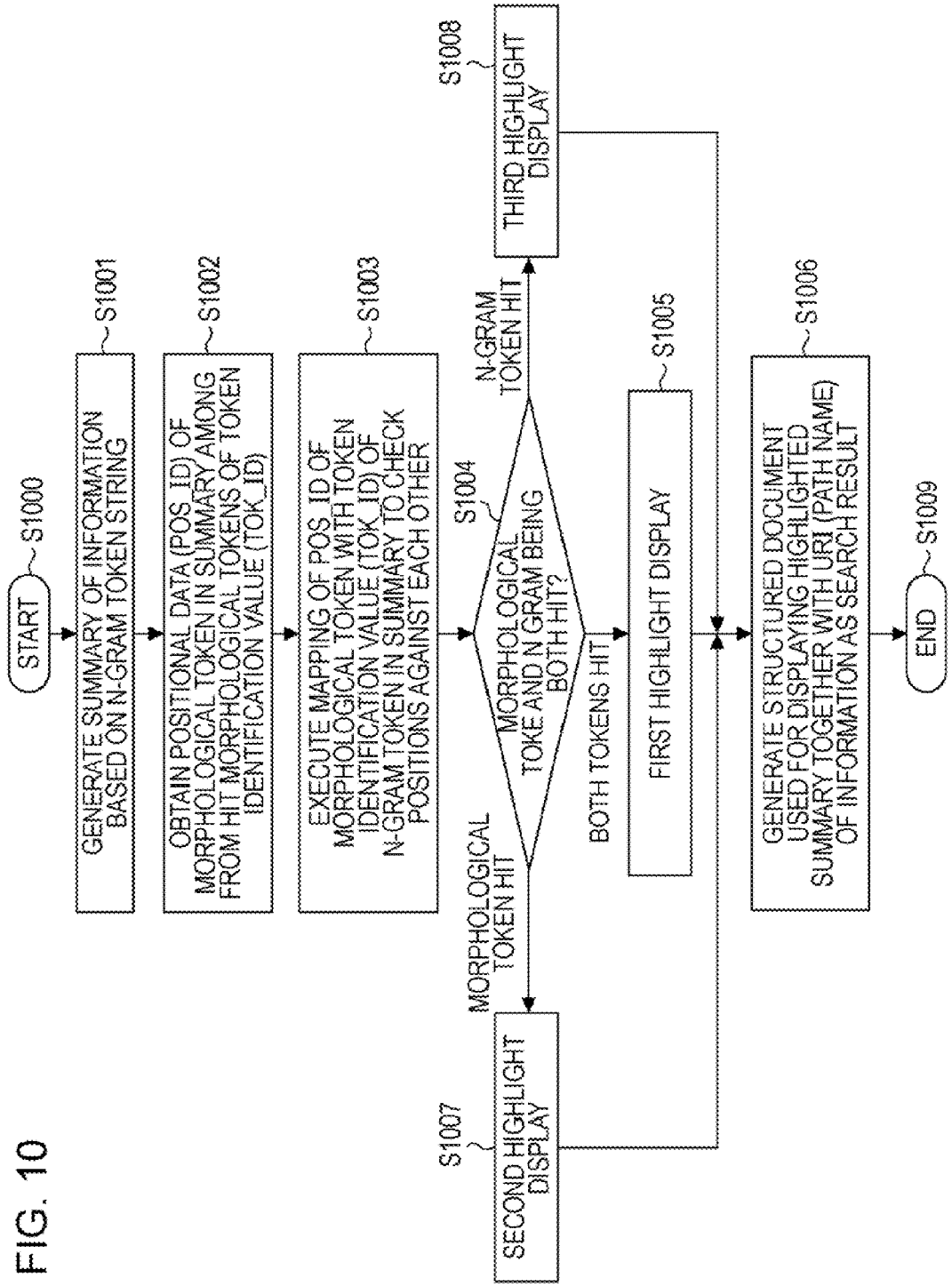
FIG. 10 is a flowchart of an example of search result generating processing executed with a search result generating unit 214.

FIG. 10 is a flowchart of an example of search result generation processing executed with the search result generating unit 214. The processing starts with step S1000. In step S1001, a summary of the information is generated using the N-gram token string. The summary can be generated by extracting a predetermined amount of the first character string including a particular search word among character strings in the information and combining the extracted data using a text editor. Further, in another example thereof, character strings having high degree of appearance of a search word, which is hit in a predetermined amount of character strings, can be arbitrarily extracted and combined as appropriate to generate the summary. The summary is generated using the N-gram token string for the purpose of obtaining exact positional information upon highlighting processing and facilitating mapping of hit counts of the morphological tokens and hit counts of the N-gram tokens and mapping of both of the hit counts. In step S102, POS_ID of a morphological token in the summary, which indicates an absolute position of document data in the information, is selected from among token identification values (TOK_ID) of the hit morphological tokens.

In step S1003, POS_ID of the morphological token is mapped to the token identification value (TOK_ID) of the N-gram token in the summary to check positions of both tokens.

In step S1004, it is determined whether N-gram tokens are also hit in a range of the morphological token based on a mapping result. If even a partial overlap is judged as an overlap between two tokens. In this case, a search result of the morphological token the meaning of which could be easily understood is set as "hit". In step S1004, if the determination result shows that both tokens are hit, a first highlight such as a font color, a background color, or a font type of a range of a search word corresponding to the morphological token is set to highlight hits of both tokens as attribute information of the summary in step S1005.

Further, if only the morphological token is hit, in step S1007, a font color is set as a display format to indicate that only the morphological token is hit, and a second highlight is set to highlight a corresponding search word and registered as attribute information of the summary. Further, if only the N-gram token is hit, attribute information is additionally registered in the summary in order to set a third highlight to highlight a corresponding search word to indicate that only the N-gram token is hit. In another example thereof, a morphological token included in the search word can be displayed in accordance with expressional variations instead of highlighting the search word input by a user.

In step S1006, an appropriate format is set like a structured document for displaying the highlighted summary together with URI or path name of information as a search result, and sent to the clients 102 through the network adaptor 202 and displayed on a display screen of the clients 102. In step S1009, the processing is terminated.

Figure 11:
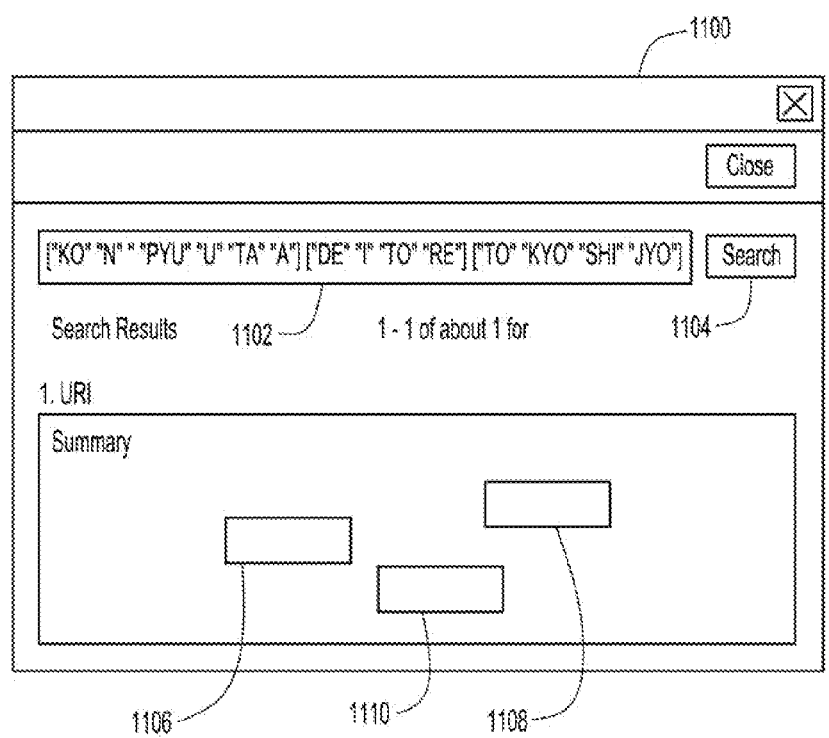
FIG. 11 shows an example where a summary of document data in information is highlighted.

FIG. 11 shows an example where a summary of the document data in the information is highlighted in this embodiment. As shown in FIG. 11, a window 1100 is displayed on a display screen of the clients 102, and a search word entry field 1102 and a search button 1104 are arranged in the window 1100. In the example of FIG. 11, a user accesses the server 104 to open an entry screen of a search engine. In this case, if accesses to the search engine should be limited, the accesses may be limited using a set of password and user ID, for example.

A user enters a search word in the search word entry field 1102 of the search screen of FIG. 11. In the illustrated example, the search words can be recognized as a search word string by inserting a space between the search words. In addition, an entry field may be set for each search range, for example, an information search area such as metadata, a title, and a main body of a text, to enter search words with AND or OR. In the example of FIG. 11, the search word string is ["ko" "n" "pyu" "u" "ta" "a"], ["de" "i" "to" "re"] and ["to" "kyo" "shi" "jyo"].

After that, a user clicks the search button 1104 to send the search word (string) together with the search request to the server 104. In response to the search request, the server 104 starts the search processing unit 206 to analyze the search word (string) to call the database management unit 204 to execute search processing to generate a search result with the search result generating unit 214. The search result is used for generating a file for displaying a result. The generated search result is sent from the server 104 to the clients 102 and displayed on a GUI (graphical user interface) displayed on the display screen of the clients 102 of FIG. 11. In the example of FIG. 11, the URI or path name of the targeted information is displayed in a linkable manner, and a summary of the document data in the information is displayed in a text display field below the URI or path name. Any existing structured document such as an HTML or XML file can be used as a file describing a search result. In another example where a system is configured using a dispersive computing system, not a web service, a search result can be generated in any file form, which is linkable to the searched information and can be highlighted.

The displayed summary is generated with the first to third highlights corresponding to the correspondence level between tokens in accordance with a hit rate upon the search processing, using morphological tokens in a range where a search token is hit among the tokens in the document data and optionally using tokens corresponding to expressional variations. For example, if only the N-gram tokens are hit, the morphological token in a range of search token corresponding to the hit N-gram token is displayed with the third highlight 1106. Further, in the example of FIG. 11, if only the morphological tokens are hit, a range of search token including expressional variations and corresponding to the morphological token is displayed with the second highlight 1108. Further, in the example of FIG. 11, ["ko" "n" "pyu" "u" "ta"] is registered in a dictionary. This "conpyuta" does not match with the search word ["ko" "n" "pyu" "u" "ta" "a"] with the prolonged sound of the last character and thus is not counted as a search result of N-gram token. On the other hand, the morphological token matches with the search word ["ko" "n" "pyu" u" "ta" "a"] in consideration of expressional variations and thus is counted as a search result. This hit result is sent back.

Further, in the case where both of the morphological tokens and N-gram tokens are hit, a corresponding morphological token area is displayed with the first highlight 1110. In the example of FIG. 11, ["to" "kyo" "shi" "jyo"] is registered as a morphological token. The N-gram tokens matched with ["to" "kyo" "shi" "jyo"] are all hit, so the morphological token is displayed with double highlights. As for the first, second, and third highlights, in order to indicate the degree of reliability of search results, a format of the first highlight is given the most impressive color, font size, and background color. The next impressive ones are given to the second highlight, and the least impressive ones are given to the third highlight.

In this embodiment, the search result includes both of the morphological tokens and the N-gram tokens. Both of the tokens can be confidentially ranked, so it is possible to increase fidelity to the search word, minimize the omission, and respond to the level of maintenance of a dictionary, or a new word or special word. In the example of FIG. 11, if the search result is ranked as well as highlighted, the number of user's pull-down operations due to unsatisfactory search results can be reduced, and a user's satisfaction level to the search engine can be raised.

As described above, according to the present invention, different kinds of character string analysis methods are equivalently applied for information search. Accordingly, it is possible to provide a search system, a search method, and a search program product, which can search for information more faithfully to a character string in the information. Further, in the above embodiments of the present invention, the morphological analysis method and the N-gram method are described as the character string analysis method. However, any other character string analysis method is suitable for a particular language, referencing and search processing can be performed using the character string analysis method optimum to a particular language. Those skilled in the art could easily realize such a modification. Examples of the particular language include languages using characters other than alphabetical characters such as Chinese, Japanese, and Korean, which are called CJK (Chinese, Japanese, and Korean), and Arabic. The present invention is applicable to the other languages.

In the embodiments of the present invention, each functional means and processing of each functional means are described to facilitate the understanding of the present invention. However, the present invention is not limited to the above example where particular functional means execute particular processes, but functions for executing the above processing can be assigned to any other functional means in consideration of processing efficiency or programming efficiency upon implementation.

The functions of the present invention can be realized by a computer-executable program described in the object oriented programming language such as C++, Java®, Java® Beans, Java® Applet, Java® Script, Perl, or Ruby or a search language such as SQL, and stored in a computer-readable recording medium and distributed or transmitted.

The present invention is described by way of particular embodiments. However, the present invention is not limited to the embodiments, and those skilled in the art could perform modification of the invention within the scope of the invention such as addition, change, or omission as the other embodiments. Any embodiment that can realize operations and advantages of the present invention is encompassed in the scope of the present invention.

REFERENCE NUMERALS

100: search system
102: client computer (client)
104: server
106: database
108: network
110: database server
112: database
200: functional block (server)
202: network adaptor
204: database management unit
206: search processing unit
208: query generating unit
210: query issuing unit
212: query processing unit
214: search result generating unit
216: morphological token generating unit
218: N-gram token generating unit
220: index generating unit
230: search engine
306: index list
308: index data

The invention claimed is:

1. A search system comprising:
a database for storing information including a plurality of documents to be searched for; and
a computer system with at least one processor, and further including:
a communication processing unit to receive a search request including a search word, send the search request to search the database, and send a search result; and
a search engine to receive the search request through the communication processing unit and search for the information, said search engine comprising:
a token assignment unit to extract a character string from each of the documents of the information and assign a plurality of different kinds of tokens to each document with each kind of token obtained by applying a corresponding character string analysis to the character string extracted from that document, wherein a combination of at least two different types of character string analyses are applied to assign the plurality of different kinds of tokens to each document;
an index generating unit to generate an index list that registers the tokens, a token type identifying a corresponding type of the character string analysis used, an information identification value for identifying the registered information, and a score for each of the plurality of kinds of tokens;
a search processing unit to:
receive the search word used for inquiring for the information;
extract a plurality of kinds of search tokens from the search word by applying the different types of character string analyses to the search word;
link the plurality of kinds of search tokens extracted from the search word in parallel to issue a search command to inquire the information in parallel for searching through the index list based on the search command; and
determine a total score for each of one or more documents of the information by identifying one or more of the plurality of kinds of tokens assigned to that document matching the search tokens of the search word and combining the scores of each of the identified plurality of kinds of tokens;
a search result generating unit to generate a file used for displaying the information obtained by searching in association with the search word upon performing the parallel inquiry, as a search result and ordering within the file the information obtained by searching based on the total scores for the one or more documents.

2. The search system according to claim 1, wherein the index list further registers the scores assigned in association with the token type, and the search result generating unit orders the information in the file in descending order of the total scores.

3. The search system according to claim 2, wherein the search result generating unit generates a summary from the character string from each of the documents in the information, and adds to the summary different attribute information to identify tokens that are each inquired using the plurality of kinds of search tokens and other tokens redundantly inquired using the plurality of kinds of search tokens to display a correspondence level of the plurality of kinds of search tokens.

4. The search system according to claim 3, wherein the search processing unit receives a search string including a plurality of search words to generate a plurality of kinds of search tokens from the plurality of search words, and generates a search command to execute inquiries inclusive of a plurality of the parallel inquiries corresponding to the search string to calculate the sum of total scores associated with each of the plurality of search words for documents in extracted information to generate the file for the search string.

5. The search system according to claim 4, wherein the character string is a character string including single-byte characters, or a character string including multibyte characters comprising at least one of Chinese, Japanese, Korean, and Arabic characters.

6. The search system according to claim 1, wherein the database is managed with a remote server connected through the communication processing unit.

7. The search system according to claim 1, wherein the character string is a character string including multibyte characters comprising at least one of Chinese, Japanese, Korean, and Arabic characters.

8. A search method for searching for information including a plurality of documents stored in a computer-accessible form, comprising:
- extracting a character string from each of the documents of the information stored in a computer-accessible form;
- executing a combination of at least two different types of character string analyses and assigning a plurality of different kinds of tokens to each document with each kind of token obtained by applying a corresponding character string analysis to the character string extracted from that document;
- receiving a search word used upon referencing the information, and extracting a plurality of kinds of search tokens from the search word by applying the different types of character string analyses to the search word;
- linking the plurality of kinds of search tokens extracted from the search word in parallel to issue a search command to inquire the information in parallel;
- sending the search command to an index list that registers the tokens, a plurality of token types identifying a corresponding type of the character string analysis used, an information identification value for identifying the registered information, and a score for each of the plurality of kinds of tokens;
- searching the index list based on the search tokens in the search command and determining a total score for each of one or more documents of the information by identifying one or more of the plurality of kinds of tokens assigned to that document matching the search tokens of the search word and combining the scores of each of the identified plurality of kinds of tokens; and
- displaying results of the searching of the index list as a search result and ordering the results based on the total scores for the one or more documents.

9. The search method according to claim 8, further comprising:
- ordering the results in descending order of the total scores.

10. The search method according to claim 9, wherein displaying the results comprises:
- generating a summary from the character string from each of the documents in the information; and
- adding to the summary different attribute information to identify tokens that are each inquired using the plurality of kinds of search tokens and other tokens redundantly inquired using the plurality of kinds of search tokens to display a correspondence level of the plurality of kinds of search tokens.

11. The search method according to claim 10, wherein issuing the search command comprises:
- receiving a search string including a plurality of search words to generate a plurality of kinds of search tokens from the plurality of search words; and
- generating a search command to execute inquiries inclusive of a plurality of the parallel inquiries corresponding to the search string.

12. The search method according to claim 11, wherein the character string is a character string including single-byte characters, or a character string including multibyte characters comprising at least one of Chinese, Japanese, Korean, and Arabic characters.

13. The search method according to claim 8, wherein the character string is a character string including multibyte characters comprising at least one of Chinese, Japanese, Korean, and Arabic characters.

14. A computer-executable program product stored in at least one non-transitory storage medium that causes a computer to execute a set of programmatic instructions, said computer-executable program product comprising:
- computer program code, which is stored in at least one non-transitory storage medium, configured to extract a character string from each of a plurality of documents of information stored in a computer-accessible form;
- computer program code, which is stored in at least one non-transitory storage medium, configured to execute a combination of at least two different types of character string analyses and assign a plurality of different kinds of tokens to each document with each kind of token obtained by applying a corresponding character string analysis to the character string extracted from that document;
- computer program code, which is stored in at least one non-transitory storage medium, configured to receive a search word used upon referencing the information, and extract a plurality of kinds of search tokens from the search word by applying the different types of character string analyses to the search word;
- link the plurality of kinds of search tokens extracted from the search word in parallel to issue a search command to inquire the information in parallel;
- computer program code, which is stored in at least one non-transitory storage medium, configured to send the search command to an index list that registers the tokens, a plurality of token types identifying a corresponding type of the character string analysis used, an information identification value for identifying the registered information, and a score for each of the plurality of kinds of tokens;
- computer program code, which is stored in at least one non-transitory storage medium, configured to search the index list based on the search tokens in the search command and determine a total score for each of one or more documents of the information by identifying one or more of the plurality of kinds of tokens assigned to that document matching the search tokens of the search word and combining the scores of each of the identified plurality of kinds of tokens; and
- computer program code, which is stored in at least one non-transitory storage medium, configured to display results of the searching of the index list as a search result and ordering the results based on the total scores for the one or more documents.

15. The computer-executable program product according to claim 14, further comprising:
- computer program code, which is stored in at least one non-transitory storage medium, configured to order the results in descending order of the total scores.

16. The computer-executable program product according to claim 15, wherein the computer program code configured to display the results further comprises:
- computer program code, which is stored in at least one non-transitory storage medium, configured to generate a summary from the character string from each of the documents in the information; and
- computer program code, which is stored in at least one non-transitory storage medium, configured to add to the summary different attribute information to identify tokens that are each inquired using the plurality of kinds of search tokens and other tokens redundantly inquired using the plurality of kinds of search tokens to display a correspondence level of the plurality of kinds of search tokens.

17. The computer-executable program product according to claim 16, wherein the computer program code configured to issue the search command further comprises:
   computer program code, which is stored in at least one non-transitory storage medium, configured to receive a search string including a plurality of search words to generate a plurality of kinds of search tokens from the plurality of search words; and
   computer program code, which is stored in at least one non-transitory storage medium, configured to generate a search command to execute inquiries inclusive of a plurality of the parallel inquiries corresponding to the search string.

18. The computer-executable program product according to claim 17, wherein the character string is a character string including single-byte characters, or a character string including multibyte characters comprising at least one of Chinese, Japanese, Korean, and Arabic characters.

19. The computer-executable program product according to claim 14, wherein the character string is a character string including multibyte characters comprising at least one of Chinese, Japanese, Korean, and Arabic characters.

* * * * *